United States Patent [19]

Bunyan

[11] 4,326,826
[45] Apr. 27, 1982

[54] BOLTS AND METHODS OF BOLTING

[75] Inventor: Thomas W. Bunyan, London, England

[73] Assignee: Pilgrim Engineering Developments Limited, London, England

[21] Appl. No.: 45,199

[22] Filed: Jun. 4, 1979

[51] Int. Cl.³ .............................................. F16B 35/00
[52] U.S. Cl. ..................................... 411/339; 411/432
[58] Field of Search ............. 85/1 T, 1 R, 32 T, 1 C; 411/44, 366, 338, 432, 427, 339, 367, 434

[56] References Cited

U.S. PATENT DOCUMENTS

| | | | |
|---|---|---|---|
| 1,194,792 | 8/1916 | Stewart | 85/1 R |
| 1,607,274 | 11/1926 | Hecht | 411/432 |
| 1,831,392 | 11/1931 | Pierce | 85/1 R |
| 2,764,266 | 9/1956 | Haworth | 85/1 R |
| 4,048,898 | 9/1977 | Salter | 85/1 R |
| 4,192,621 | 3/1980 | Barth | 85/1 T |

FOREIGN PATENT DOCUMENTS 463499 7/1928 Fed. Rep. of Germany .

Primary Examiner—Francis K. Zugel
Attorney, Agent, or Firm—Woodcock, Washburn, Kurtz, Mackiewicz & Norris

[57] ABSTRACT

A bolt comprises a tapered shank. The shank comprises an outer member with a cylindrical bore and an inner member with a cylindrical outer surface that is a close fit in the cylindrical bore. The inner member is secured to the outer member at the broader end of the shank and a screw thread is secured on a portion of the inner member projecting from the narrower end of the outer member, for receiving a nut which is used in tensioning the bolt into the workpiece.

9 Claims, 8 Drawing Figures

BOLTS AND METHODS OF BOLTING

The present invention relates to improvements in tapered dowel bolts and methods of bolting using tapered dowel bolts and is concerned especially with the bolted flange couplings in ships tailshafts although it will be appreciated that the invention can be used in other fields of application.

The tapered dowel bolt is commonly used for bolted flanged couplings in ships tailshafts, particularly in the U.S.A. It has the advantage of a "fitting" bolt (i.e. a bolt which completely fills the bolt holes) that, with moderate levels of reversed torques (torsional vibration) applied to the shafting, there is no slip or frettage between the coupling faces of the flange coupling. To achieve such a fit with a "parallel" bolt, each bolt must be an adequate interference fit in the bolt holes, i.e. the bolt diameter must be of the order of ⅓ of a thousandth of the diameter of the bolt larger than the diameter of the bolt hole in order that radial pressure against the wall of the bolt hole is not lost when the bolt is tensioned. The bolt must be driven into the bolt hole by heavy hammer blows or forced into position by means of a hydraulic ram. The procedure is a time consuming and costly affair requiring the application and integrity of a skilled fitter. The dismantling of couplings necessary at every periodic tailshaft survey, i.e. once every three or four years—means that periodically these coupling bolts must be either forced or driven out with the ever-present risk of tearing the surface of the bolt or the bolt hole due to partial seizure of the metal to metal contact between bolt and coupling bolt hole. The use of moly-slip grease has greatly reduced this hazard, but seizures and surface damages do still regularly occur making it necessary to start with a new over-size bolt for fitting in a reconditioned reamed over-size bolt hole: a time consuming and expensive operation.

The main propulsion shafting of a ship driven by a direct-coupled slow-speed marine diesel engine experiences probably the most severe service condition for shafting because, in addition to the usual shipboard bending and axial dynamic strains to which the shafting is subjected, high levels of vibratory torque are superimposed due to the cyclic irregularities in the transmitted torque from the engine cylinders. These torques excite a number of major and minor vibration criticals at which critical speeds the vibratory torques are dynamically magnified by a factor which could reach 10 times the exciting torques. In fact the dynamic torque could exceed the mean transmitted torque by a factor approaching twice the mean torque. It can therefore be seen that with direct-coupled marine diesel engine shafting, there must be no doubt as to the quality of the fit of bolts in bolted couplings. All bolts must be a good quality interference fit, otherwise serious fatigue failure of the bolted connections will occur in service. Each bolt must be matched to its own bolt hole with the necessary interference fit, and the bolt hardened up to say 8 tsi. Such an assembly automatically has an adequate reserve of elastic strain built into it which will allow for the unavoidable "bedding in" which occurs during the first few hundred running hours, levelling off the high spots in the fit resulting from manufacturing inaccuracies. All dynamically strained bolts must be "sounded" i.e. "hardened up" with ring spanner and hammer after the ship trials and during the first voyage of the ship.

The solid taper dowel bolt has the considerable advantages that a solid fit of the bolt in the taper reamed bolt hole can be so simply obtained and that dismantling of the couplings can be so easily accomplished without any danger of seizure. These bolts are however not popular in direct-coupled diesel engine drives for the reason that the elastic strain developed in the assembly is less than half of that developed with the parallel bolt. In other words, the "effective" stretching length is less than half that of the parallel bolt. Thus with conventioned tapered bolts under dynamic conditions the slightest loss in residual strain during the "bedding in" process can result in serious slackness and frettage such that repeated "hardening up" is required. If frettage is allowed to develop the "bedding in" process is never completed but is regenerated with each attack of frettage.

The object of the taper bolt of the present invention is to retain the highly desirable features of the solid taper dowel bolt, but to build into the assembly a strain capacity comparable with that of the parallel bolt.

According to the present invention in one aspect a tapered dowel bolt has a tapered shank which comprises an inner member and an outer member, the outer member having a tapered outer surface and an axially-extending cylindrical bore, the inner member having a cylindrical outer surface which is a close fit in the cylindrical bore, the inner member being anchored to the outer member at the broader end of the shank and projecting from the outer member at the narrower end of the shank, and means being provided on the projecting portion of the shank for securing a nut or other abutment means to the inner member.

Preferably the tapering outer surface of the outer member is provided by a uniformly-tapering frusto-conical portion and the cylindrical bore is coaxial with the frusto-conical portion.

According to the present invention in a second aspect there is provided a dowel connection comprising two abutting members with a tapered bore extending through the two members, and a dowel bolt located in the tapered bore, the dowel bolt having a tapered shank which comprises an inner member and an outer member, the outer member having an outer surface which tapers to correspond with the tapered bore, and having an axially-extending cylindrical bore, the inner member having a cylindrical outer surface which is a close fit in the cylindrical bore, the inner member being anchored to the outer member at the broader end of the shank and projecting from the outer member at the narrower end, the tapered bolt being inserted in the tapered bore and a nut or other abutment means being secured to the projecting end of the inner member to secure the bolt in the tapered bore.

The present invention in another aspect provides a method of bolting together two members including providing a tapered bore through abutting portions of the members, inserting a bolt as set out above with a correspondingly tapered outer surface in the said tapered bore, applying a nut or other abutment means to the means on the projecting end to hold the bolt in tension.

Embodiments of the invention will now be described, by way of example, with reference to the accompanying drawings, in which.

Figure 1:
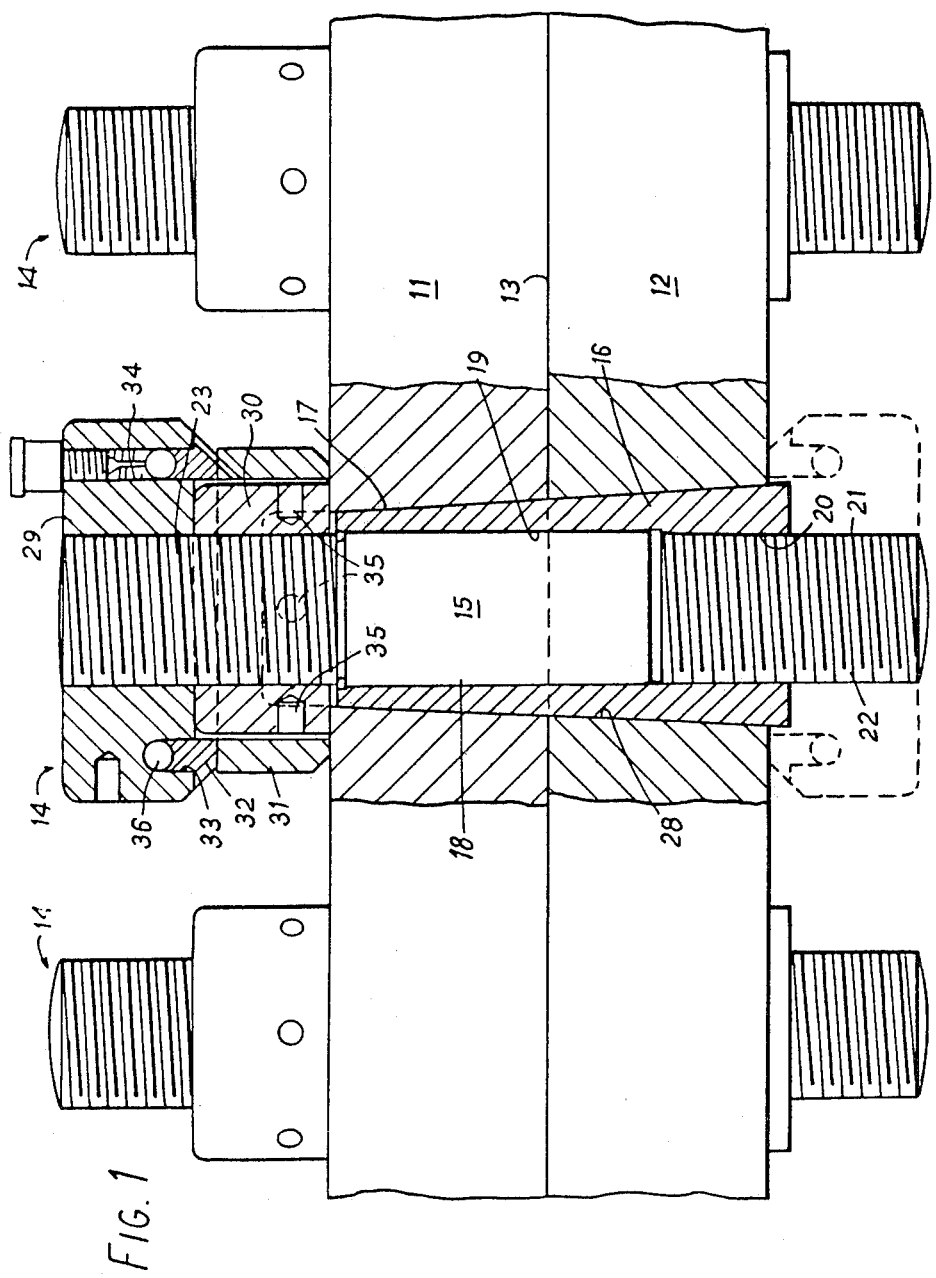
FIG. 1 shows coupling flanges of a shafting arrangement connected by high-strain taper dowel bolts according to the invention.

Referring to FIG. 1, this shows a fragmentary view partly in section of two coupling flanges 11 and 12 carried by different sections of the shafting (not shown) for a direct coupled diesel-motor driven ship. The end faces 13 of the flanges abut and the flanges are secured together by tapered dowel bolts 14.

Each dowel bolt 14 has a tapered shank which comprises an inner member 15 and an outer member 16. The outer member or sleeve 16 is of high tensile steel and has a frusto-conical outer surface 17 with a 1/12 taper. The inner member 15 is of high tensile steel and has a cylindrical or parallel surface 18 which is a close fit in a cylindrical parallel bore 19 in the outer member. The bore 19 is coaxial with the frusto-conical surface 17.

At the broader end of the shank the outer member has a screw-threaded bore 20 which extends from the end of the cylindrical bore 19 to the end of the outer member. The screw-threaded bore 20 is of smaller diameter than the cylindrical bore 19 so that it can engage with a screw-thread portion 21 on one end of the inner member or stud 15. The inner member 15 can be inserted into the bore in the outer member 16 from the narrower end and the threads engaged to secure the inner and outer members together at the broader end of the shank. Part 22 of the screw-threaded portion 21 projects beyond the end of the outer member 16.

The inner member 15 projects also from the narrower end of the tapered outer member 16 and has a screw-thread portion 23 for receiving a tensioning nut. The screw-thread portions 21 and 23 are both of smaller diameter than the cylindrical portion. The radial clearance between the outer member 16 and the inner member 15 is deliberately chosen such that at a load corresponding to approximately 8 tsi in an equivalent solid taper bolt at mid length that is opposite the abutting faces 13 of the coupling flange 11 and 12, the radial clearance is closed so that the bolt 14 becomes effectively a solid bolt. However, by the time this point is reached, the bolt 14 has achieved a total residual strain in excess of that of a parallel bolted assembly, while maintaining the same axial load between the coupling faces.

A hydraulic nut 29 such as is described in our British Pat. No. 991,783 may be used for tensioning the bolt. The bolt 14 is first inserted into the correspondingly 1/12 tapered hole 28 in the flanges 11 and 12 and a working nut 30 of mild steel is nipped up on the threaded portion 23. A spacer ring 31 is placed around the nut 30 and then the hydraulic nut 29 fitted over the working nut. The hydraulic nut has an annular piston 32 which fits in an annular groove 33 in the face of the hydraulic nut and which bears against the upper face of the spacer ring 31. A hollow tubular tire 36 is located in the groove 33 behind the annular piston. The interior of the tire is connected to a source of hydraulic pressure through a bore 34. The hydraulic pressure expands the tire forcing the annular piston against the spacer ring which in turn is forced against the surface of the flange 11. The force of the hydraulic fluid tensions the tapered bolt and whilst the bolt is fully strained in this way the working nut 30 is screwed down hard with a tommy bar inserted through circumferential slots (not shown) in the spacer ring 31 into radial bores 35 in the working nut. The hydraulic pressure is then released and the hydraulic nut and spacer ring are removed.

Figure 2:
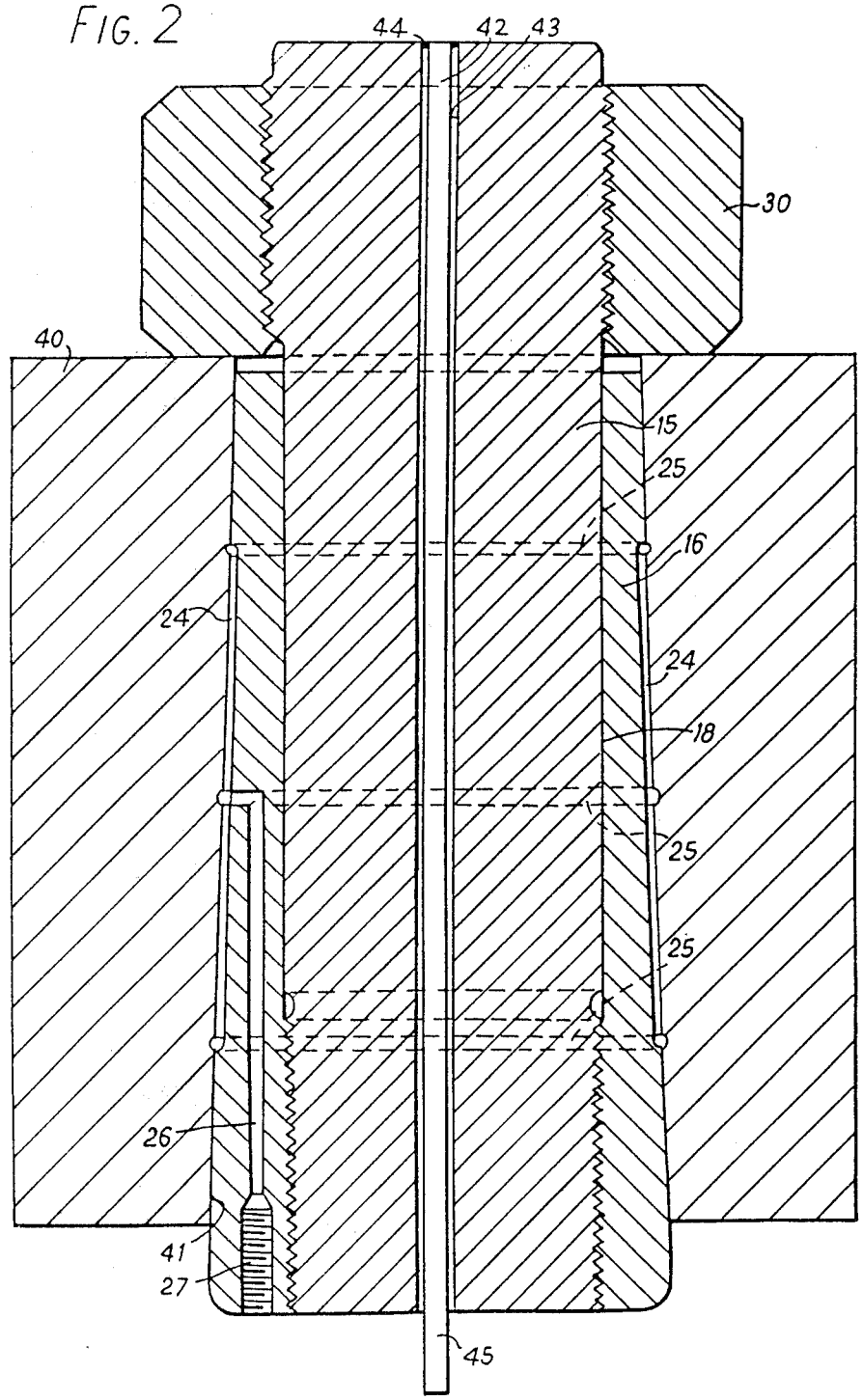
FIG. 2 shows a modification of the taper bolt of FIG. 1 in a casing assembly for test purposes.

To enable the bolt 14 to be dismantled easily and without hammering, the outer surface of the outer member is machined with interconnected longitudinal and circumferential oil grooves (not shown in FIG. 1 but corresponding to the grooves 24 and 25 of FIG. 2). The grooves are connected by an internal bore 26 to a high-pressure connection 27. Oil under high pressure is applied to the grooves through the connection 27 to separate the surface of the tapered outer member from the surface of the tapered bore 28.

To assist with the removal of the tapered bolt the hydraulic nut may be applied to the projecting portion 22 of the inner member at the broader end of the shank of the bolt, the annular piston bearing directly against the surface of the flange 12.

FIG. 2 shows a modification of the bolt of FIG. 1 for test purposes. Using a conventional hydraulic nut as sold under the Trade Mark "Pilgrim" of suitable dimensions, the High Strain taper bolt, manufactured to dimensions indicated below, was drawn hydraulically into the tapered bore of a cylindrical casing.

The taper bored casing was used to simulate a typical flange joint for which the High Strain taper bolt has been especially designed.

Dial gauges were then used to measure the extension of the parallel inner member of stud under the action of the hydraulic load from the hydraulic nut and also the corresponding "pull in" or "draw" of the tapered outer member sleeve into the cylindrical casing. A solid taper bolt was also made—of dimensions and material identical to the high strain taper bolt—and again using dial gauges suitably positioned, the bolt extension and the bolt "draw" into the cylindrical casing were both measured.

The details of the taper bolt and casing assembly of FIG. 2 were as follows.

The cylindrical casing 40 is made from mild steel, has an O/D of 5.885" and length of 5.875". The smaller I/D was 2.615" and the larger I/D at the lower end on the diagram was 3.1" as measured by an internal vernier scale. These dimensions gave a taper of the bore 41 of 1/12.1.

The tapered sleeve 16 was made from EN9 material (UTS=45 ton/in$^2$). The I/D i.e. parallel bore 19 was 2.192" as measured with an internal micrometer with dial gauge assembly. The smaller O/D was 2.6125" and the larger O/D was 3.1567" and the length of the sleeve was 6.510" giving a taper on the sleeve O/D of 1/11.96. The sleeve was finally bedded into the cylindrical casing and by using blue marking, a contact area in excess of 80% was achieved. For dismantling the assembly without hammering, jacking-off oil grooves 24 and 25 are provided and the connection to a high pressure oil supply is shown at 27.

The parallel inner member or stud 15 was also made from EN9 material. The shank of the bolt was turned in the lathe and then ground to an O/D of 2.188". Thus the initial clearance between stud and tapered sleeve was 0.004" on diameter. The stud was screwed into the tapered sleeve as shown in FIG. 2. A length of 3/16" diameter rod 42 was inserted into a ¼" diameter hole 43 drilled in the stud and tack welded at 44 to the upper end of the stud. The lower end 45 of the rod 42 projected from the end of the hole 43. The final part of the assembly was the nut 30 made from mild steel. For testing purposes however, a standard oil-filled "Pilgrim" hydraulic nut 29 was used—see FIG. 3. The major dimensions of the nut were as follows:

| Nominal size | 2¼" |
|---|---|
| Tyre O/D | 3.8125" |
| Tyre I/D | 2.9375" |
| Tyre depth | 0.4375" |
| Ring area | 4.639 in² |

Thus at 25,000 psi hydraulic pressure, the load on the stud was approximately 52 (UK) tons.

For the solid taper bolt, mentioned above, the material used was EN9 and in order to measure the bolt extension, a length of rod was inserted in a bore and tack welded to one end of the bolt in a similar fashion to that described above, reference details with reference to parts 42 to 45. Again the bolt was finally bedded into the cylindrical casing and blue marking was used to check the contact area. Finally, a contact area in excess of 80% was achieved.

DESCRIPTION OF TEST

The taper dowel bolt of FIG. 2 was assembled and the sleeve was coated with light machine oil which was then wiped off using a clean cloth. The bore of the cylindrical casing was also coated with light machine oil which again was removed using a clean cloth. This procedure was carried out in order to avoid seizure of the parts.

Figure 3:
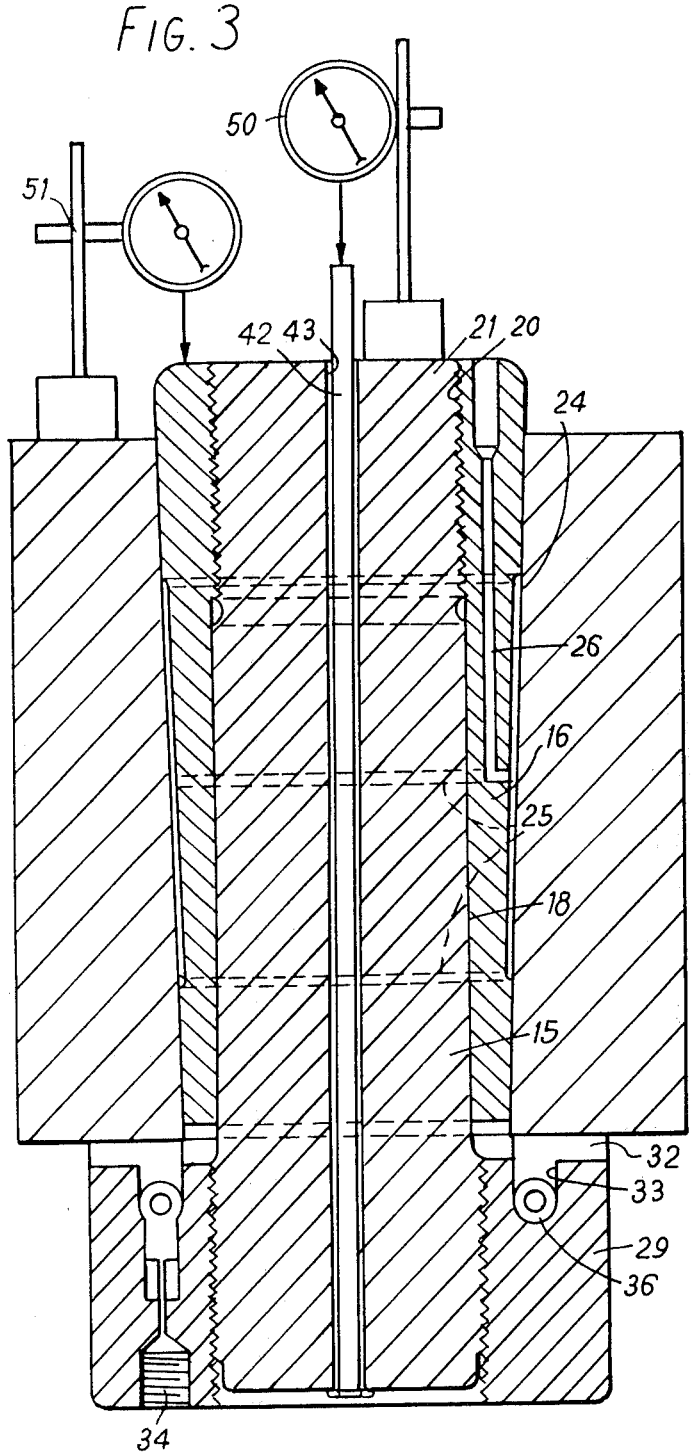
FIG. 3 shows the taper bolt of FIG. 2 in a test rig.

The bolt assembly was then positioned in the cylindrical casing 40 and the Pilgrim hydraulic nut 29 was fitted as shown in FIG. 3. The nut was connected to a high pressure oil supply at 34. Two dial gauges 50 and 51 with magnetic bases were used. One gauge 50 was mounted on the base of the stud with the probe in contact with the 3/16" diameter strain indicating rod 42 showing the longitudinal extension of the stud. The second dial gauge 51 was mounted on the base of the cylindrical casing with the probe in contact with the base of the sleeve. This gauge measured the "pull in" or draw of the sleeve into the cylindrical casing.

Hydraulic pressure was applied to the Pilgrim hydraulic nut 29 via the connection at 34 in increments of 2500 psi up to 25,000 psi and the corresponding readings of the two dial gauges 50 and 51 were recorded. Air pressure was applied to the interface between stud 15 and the sleeve 16 to confirm the load at which solid contact was made between sleeve and stud. The pressure was then returned to zero psi and the dial gauge readings were noted. The Pilgrim hydraulic nut was removed and efforts were made to turn the stud in the sleeve by hand. The stud was found to be non-rotatable indicating that the initial clearance had been closed up and the stud and sleeve assembly were as a solid taper bolt. Finally, the Pilgrim hydraulic nut was replaced and the oil supply connected to the jacking-off inlet shown at 27. The pressure was applied and increased until the bolt assembly was free in the cylindrical casing. This value of pressure was recorded. Here, the Pilgrim hydraulic nut acted as a "stop" by preventing the bolt assembly from being violently ejected out of the cylindrical casing. Once free, the bolt assembly was stripped down and cleaned. The whole test was then repeated. Typical test results are shown below. Under identical conditions as previously described, the test sequence was then repeated using the solid taper bolt already described above. Dial gauge readings for corresponding values of applied pressure were recorded and the pressure required to free the assembly was also noted. Again, typical test results for the solid taper bolt are shown below.

In both series of tests i.e. for the high strain taper bolt of the present invention and for an equivalent solid taper bolt, the draw-in was not smooth but jerky at higher loads—which is typical and due to the difference in the sliding and static friction coefficients. Care was taken to record the maximum draw-in load before a jerk.

By mounting strain gauges on the outside of the cylindrical casing in a circumferential direction, it was possible to obtain values of interference pressure/hoop stress in the casing from which friction coefficients between bolt and bolt hole were deduced.

RESULTS OF TESTS

| | FOR SOLID TAPER BOLT | | |
|---|---|---|---|
| PRESSURE lb/in² | AXIAL LOAD ON BOLT TONS | BOLT EXTENSION .001 IN | BOLT DRAW .001 IN |
| 0 | 0 | 0 | 0 |
| 1500 | 3.11 | 0 | 5.25 |
| 2500 | 5.18 | 0.25 | 7.50 |
| 5000 | 10.36 | 0.50 | 11.50 |
| 7500 | 15.54 | 1.00 | 16.00 |
| 10000 | 20.71 | 1.50 | 19.50 |
| 12500 | 25.89 | 2.00 | 19.50 |
| 15000 | 31.07 | 2.75 | 27.50 |
| 17500 | 36.24 | 3.25 | 27.50 |
| 20000 | 41.42 | 4.00 | 36.00 |
| 22500 | 46.60 | 4.5 | 36.00 |
| 25000 | 51.78 | 5.25 | 43.00 |
| 0 | 0 | 3.00 | 43.00 |

Figure 6:
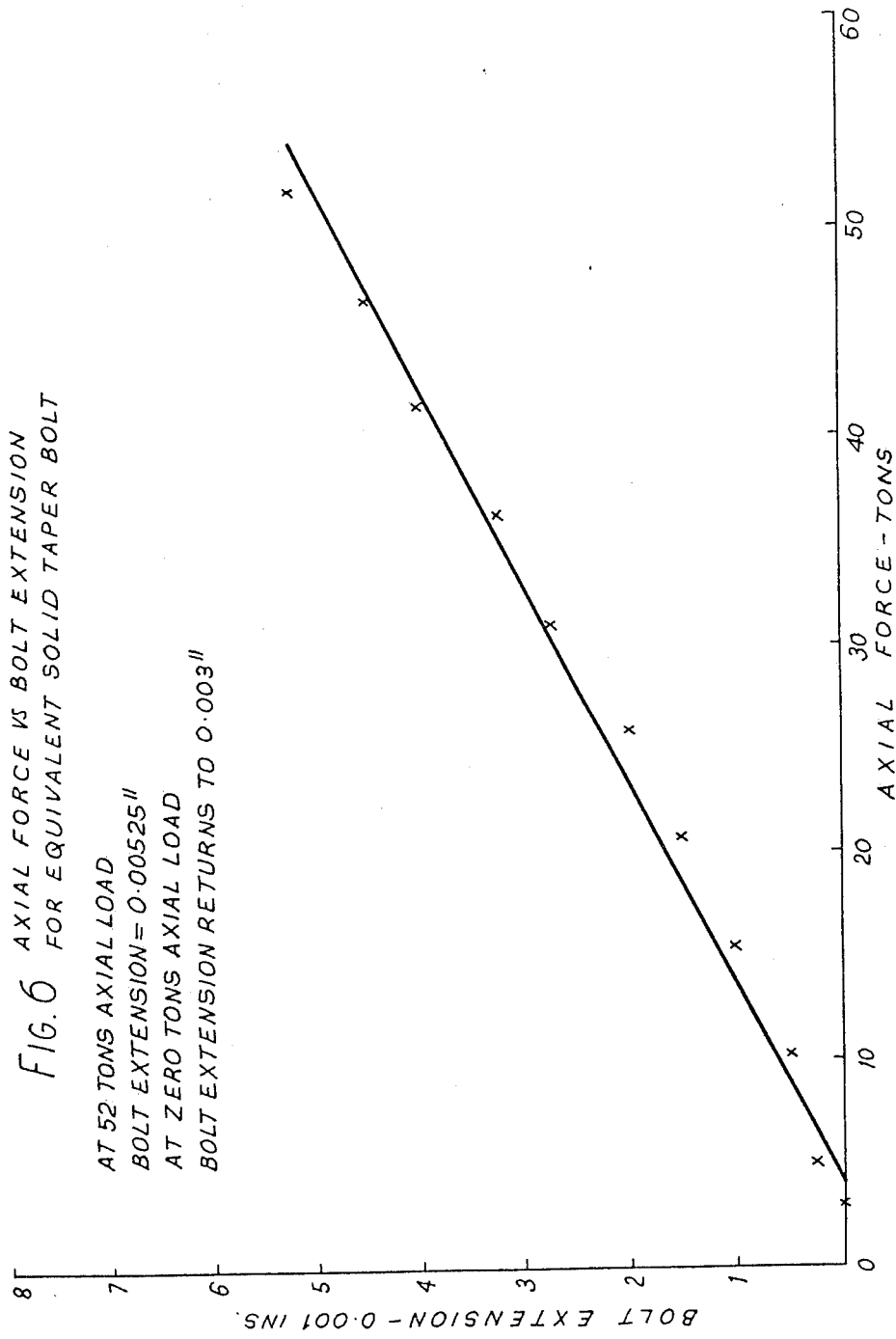
FIGS. 6 and 7 show graphs of test results on an equivalent solid taper bolt.
Figure 7:
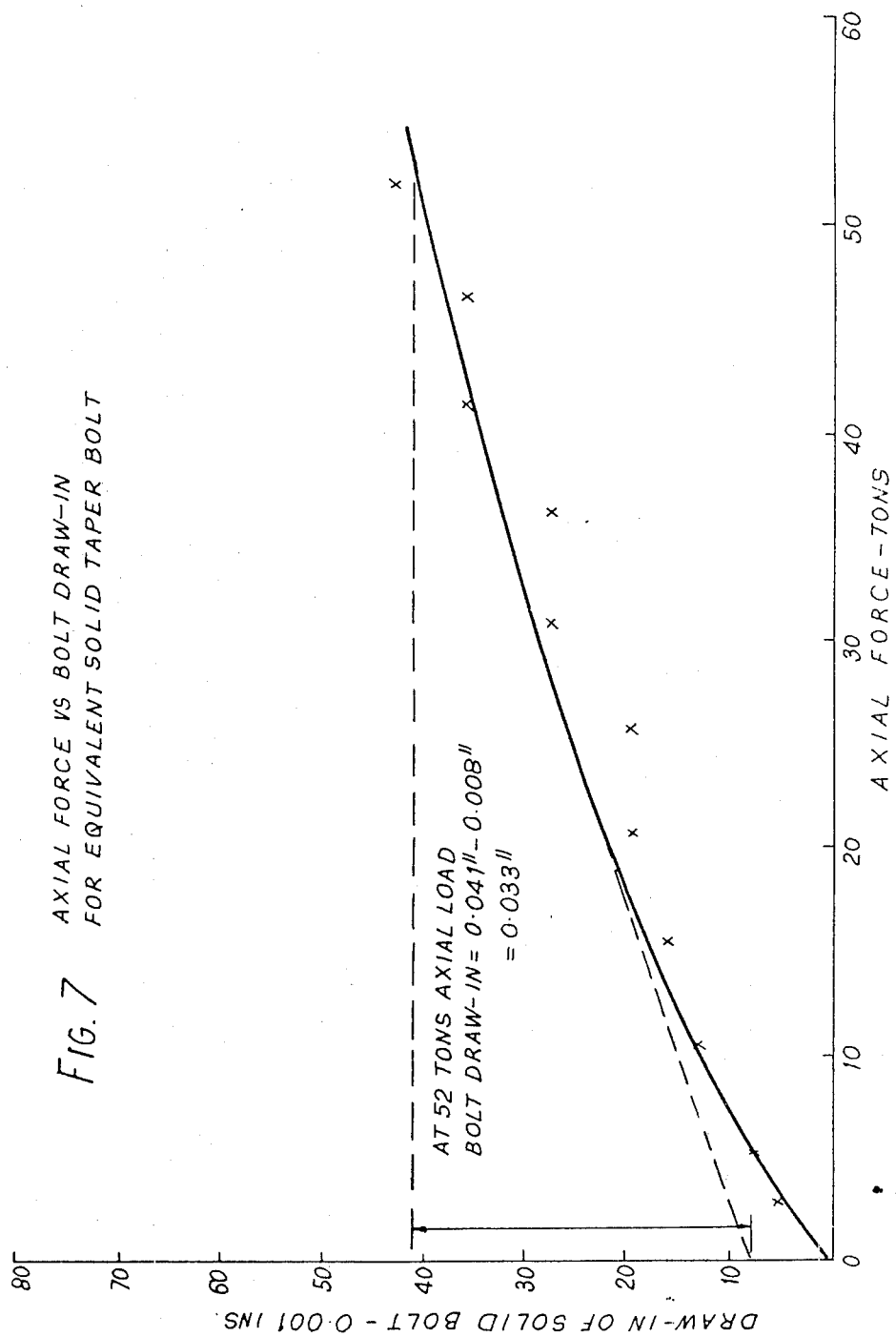

These results are shown graphically on FIGS. 6 and 7.

On dismantling the assembly, the jack-out pressure required was 15,500 lb/in² (≅6.91 ton/in²).

| | FOR HIGH STRAIN TAPER BOLT ACCORDING TO THE INVENTION | | |
|---|---|---|---|
| PRESSURE lb/in² | AXIAL LOAD ON ASSY TONS | STUD EXTENSION .001 IN | SLEEVE DRAW .001 IN |
| 0 | 0 | 0 | 0 |
| 1500 | 3.11 | 0 | 5.50 |
| 2500 | 5.18 | 0.50 | 10.50 |
| 5000 | 10.36 | 1.00 | 23.75 |
| 7500 | 15.54 | 2.25 | 27.50 |
| 10000 | 20.71 | 3.00 | 32.75 |
| 12500 | 25.89 | 3.75 | 40.00 |
| 15000 | 31.07 | 5.00 | 49.50 |
| 17500 | 36.24 | 5.50 | 58.50 |
| 20000 | 41.42 | 6.00 | 58.50 |
| 22500 | 46.60 | 7.00 | 71.0 |
| 25000 | 51.78 | 7.50 | 71.0 |
| 0 | 0 | 0.50 | 71.0 |

Figure 4:
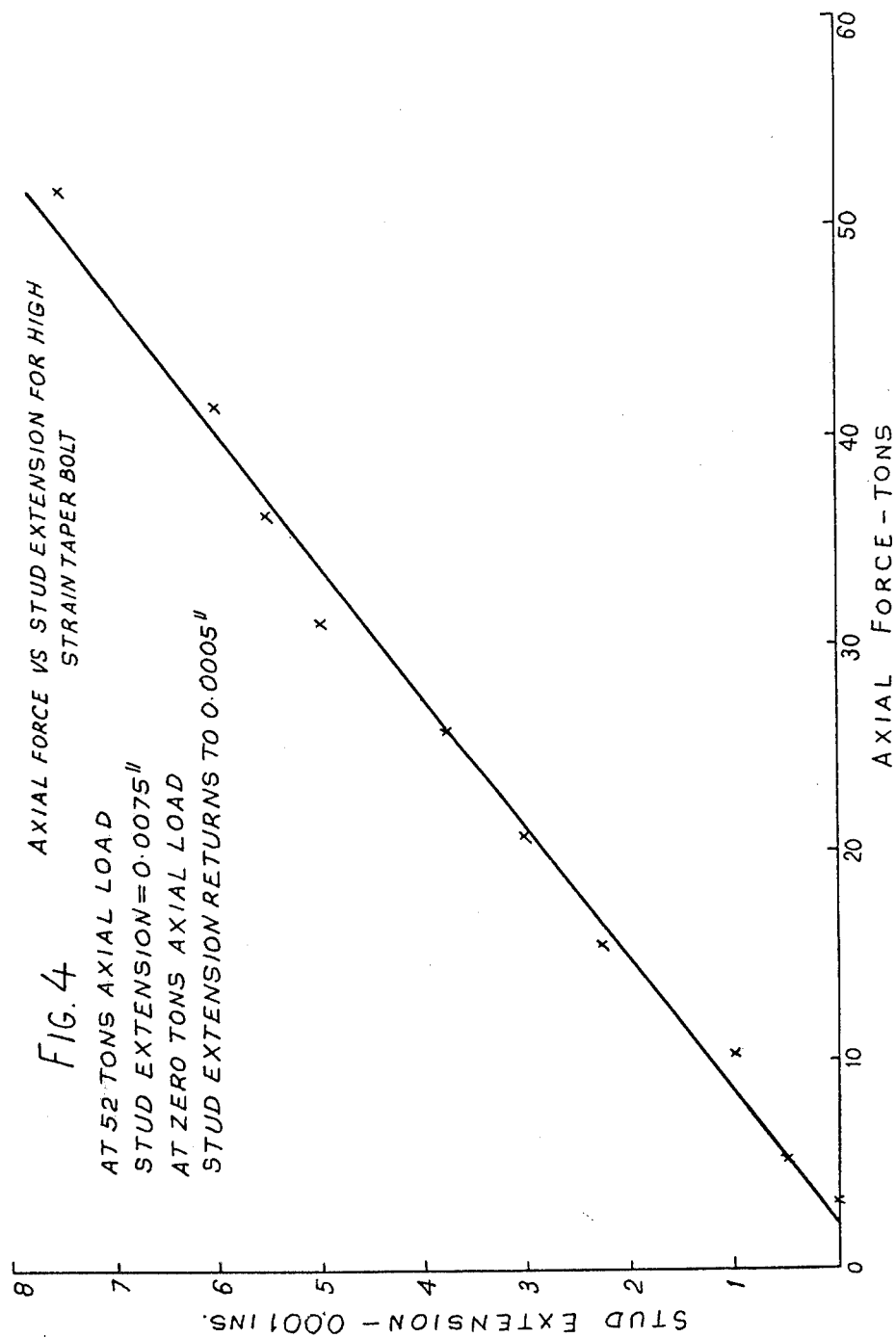
FIGS. 4 and 5 show graphs of the test results using the bolts of FIGS. 2 and 3.
Figure 5:
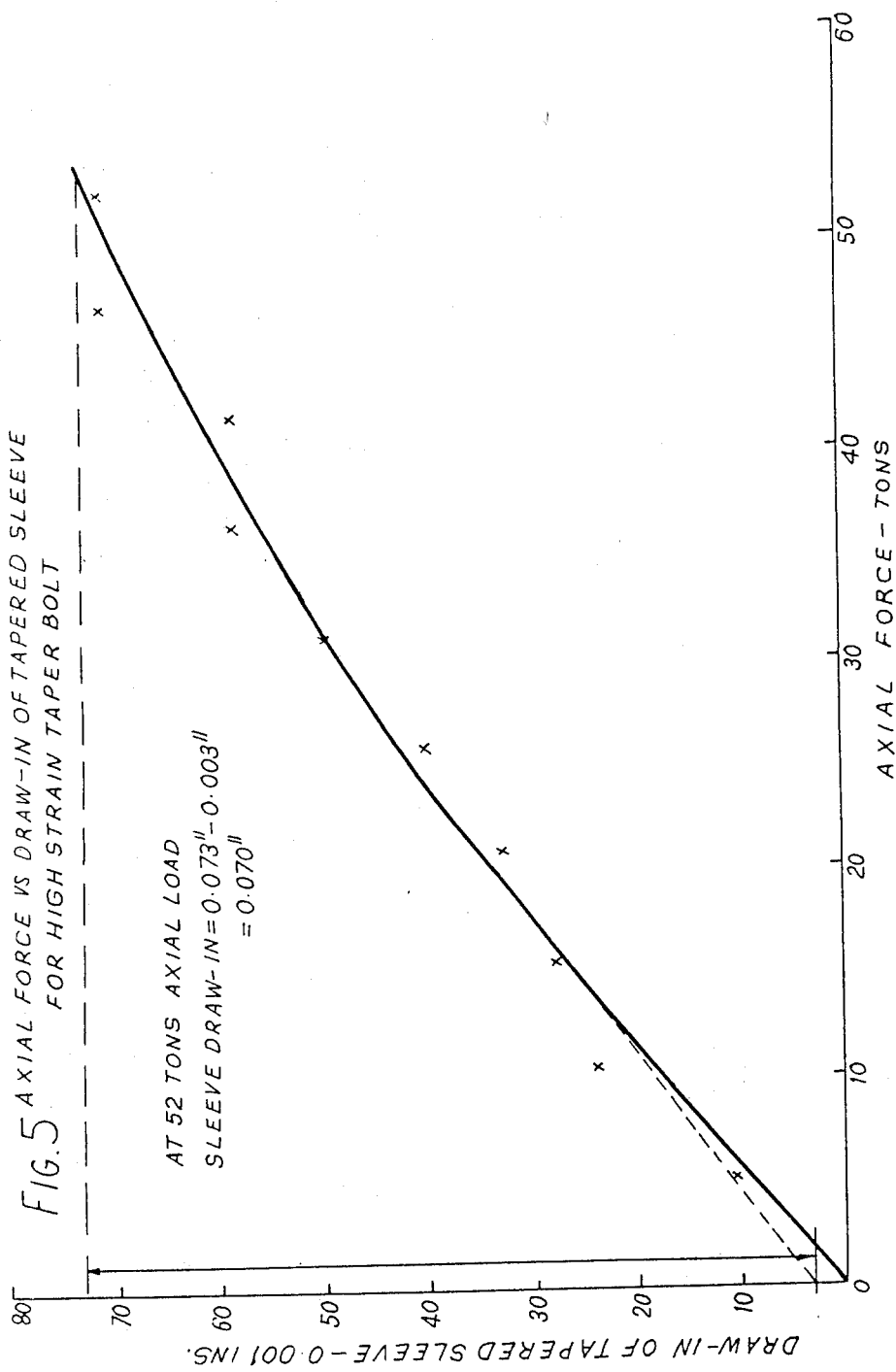

These results are shown graphically on FIGS. 4 and 5.

On dismantling the assembly, the jack-out pressure required was 11,000 lb/in² (≅4.9 ton/in²).

The results show that the reserve of effective strain of a High strain taper bolt made as described above is more than twice that for an equivalent solid taper bolt.

Figure 8:
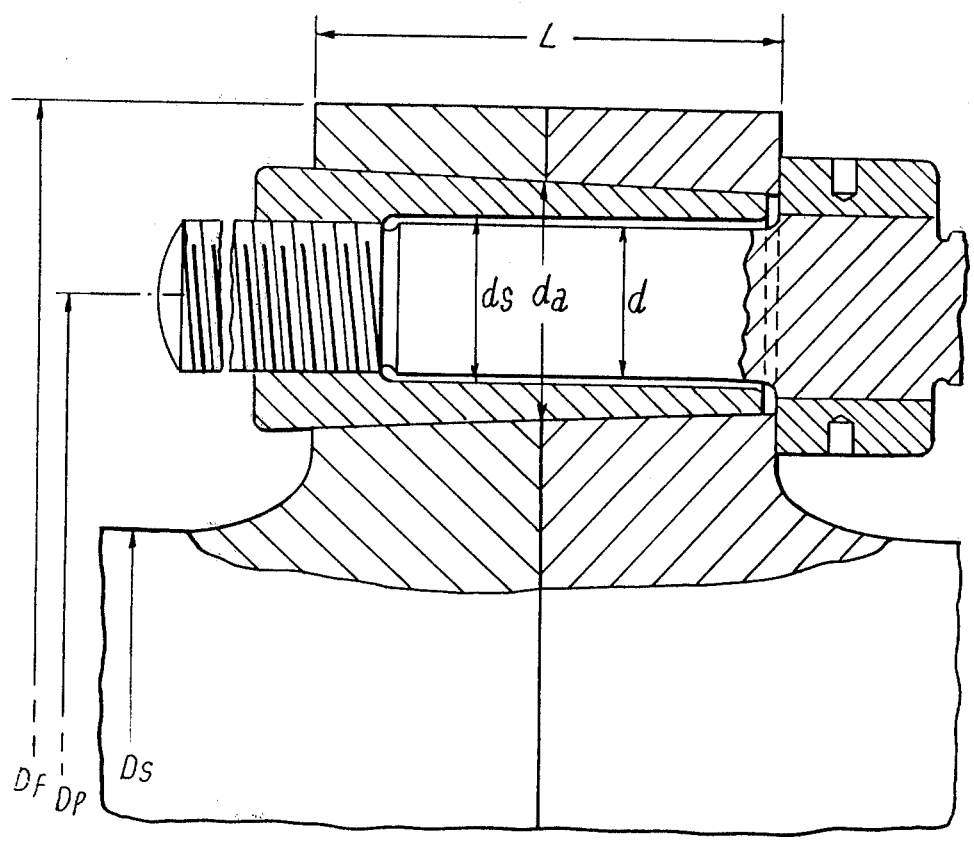
FIG. 8 shows a high strain taper bolt in a shaft coupling.

FIG. 8 shows a section of a bolt according to the invention in a flanged shaft coupling and the taper below gives a table of the suitable values for the various dimensions indicated in FIG. 8.

HIGH STRAIN TAPER BOLT-TABLE OF DIMENSIONS. SEE FIG. 8

| | symbol | | | | | | |
|---|---|---|---|---|---|---|---|
| SHAFT DIA RANGE (INCHES) | Ds | 10½–11¼ | 11½–14 | 14¼–15 | 15¼–16 | 16¼–17¼ | 17¼–19¼ |
| | | | | 19¼–23¼ | 23¼–26 | 26¼–29½ | 30 |
| PITCH CIRCLE DIA RANGE (INCHES) | Dp | 16⅝–17½ | 17⅞–21¼ | 21⅞–22¾ | 23⅞–24¼ | 24⅞–26¼ | 26¼–28⅞ |
| | | | | 29¼–34 | 34¼–37⅝ | 38¼–42½ | 43 |
| FLANGE DIA RANGE (INCHES) | Df | 21¼–22½ | 23¼–26¾ | 27¼–28⅝ | 29¼–30¼ | 31¼–32⅞ | 33¼–36 |
| | | | | 36½–41¼ | 42½–45⅝ | 46½–50¼ | 51½ |
| TOTAL FLANGE JOINT THICKNESS(L = 2da) (INCHES) | L | 6 | 6½ | 7 | 7½ | 8 | 8½ |
| | | | | 9 | 9½ | 10 | 10½ |
| BOLT DIA IN SHEAR (INCHES) | dA | 3 | 3¼ | 3¾ | 3⅞ | 4 | 4¼ |
| | | | | 4½ | 4¾ | 5 | 5¼ |
| BOLT SHEAR AREA (INCHES²) | | 7.07 | 8.30 | 9.62 | 11.05 | 12.57 | 14.19 |
| | | | | 15.90 | 17.72 | 19.64 | 21.65 |
| INITIAL CLEARANCE ON DIA BETWEEN STUD AND SLEEVE (INCHES) | | 0.0035 | 0.0038 | 0.0041 | 0.0044 | 0.0047 | 0.005 |
| | | | | .0053 | .0056 | .0059 | .0061 |
| INTERFERENCE PRESSURE (TAPERED SLEEVE/FLANGE) (TONS/IN²) | | 5.51 | 5.51 | 5.52 | 5.52 | 5.54 | 5.55 |
| | | | | 5.55 | 5.55 | 5.56 | 5.50 |
| REQUIRED AXIAL LOAD (TONS) | | 57 | 66.5 | 77.2 | 89 | 101 | 115 |
| | | | | 128 | 143 | 159 | 172 |
| SLEEVE INTERNAL DIA (INCHES) | ds | 2.123 | 2.3018 | 2.4791 | 2.6564 | 2.8327 | 3.010 |
| | | | | 3.1873 | 3.3646 | 3.5419 | 3.7181 |
| STUD DIA (INCHES) | d | 2.1195 | 2.298 | 2.475 | 2.652 | 2.828 | 3.005 |
| | | | | 3.182 | 3.359 | 3.536 | 3.712 |
| STUD AREA (INCHES²) | | 3.53 | 4.15 | 4.81 | 5.52 | 6.28 | 7.10 |
| | | | | 7.95 | 8.86 | 9.82 | 10.82 |
| STUD MEAN TENSILE STRESS (TON/IN²) | | 16.15 | 16 | 16.1 | 16.1 | 16.1 | 16.2 |
| | | | | 16.1 | 16.2 | 16.2 | 15.9 |
| BOLT ASSY MEAN TENSILE STRESS (TONS) | | 8 | 8 | 8 | 8 | 8 | 8.1 |
| | | | | 8.1 | 8.1 | 8.1 | 8.0 |

I claim:

1. A tapered dowel bolt comprising a tapered shank having a broader end and a narrower end, said shank comprising an inner member and an outer member, said outer member having a circumferentially continuous tapered outer surface to mate with a coaxial continuous tapered bore in one or more workpieces, and an axially-extending unthreaded cylindrical bore, said inner member having a cylindrical outer surface which is a close sliding fit in said cylindrical bore, said inner member being anchored to said outer member only at the broader end of said shank and including a portion projecting from said outer member at said narrower end of said shank, and means on said projecting portion of said shank securing abutment means to said inner member.

2. A bolt as claimed in claim 1 wherein said outer surface of said outer member is frusto-conical with a uniform taper and is coaxial with said cylindrical bore.

3. A bolt as claimed in claim 1 wherein said anchoring means comprise a screw-threaded portion on said inner member and a mating screw-threaded bore in said outer member between said cylindrical bore and said broader end of the outer member.

4. A bolt as claimed in claim 3 wherein said screw-threaded bore is open at said broader end of said outer member.

5. A bolt as claimed in claim 3 wherein said screw-thread bore is of smaller internal diameter than said cylindrical bore.

6. A bolt as claimed in claim 1 wherein said means for securing comprise a screw-thread on said projecting portion.

7. A bolt as claimed in claim 1 wherein the clearance between said cylindrical surface of said inner member and said cylindrical bore is such that when the bolt is inserted into correspondingly tapered bore in a workpiece and tensioned to working load the clearance gap disappears.

8. A bolt as claimed in claim 1 wherein said outer surface of said outer member has open grooves and an inlet connection is connected to said grooves for injection of oil.

9. A bolt as claimed in claim 1 wherein said inner and outer members are of high tensile steel.

* * * * *